(12) United States Patent
Lim et al.

(10) Patent No.: US 7,844,268 B2
(45) Date of Patent: Nov. 30, 2010

(54) METHOD AND APPARATUS FOR NOTIFYING CHANGED SERVICE INFORMATION ACCORDING TO TERMINAL STATE IN A WIRELESS COMMUNICATION SYSTEM

(75) Inventors: Han-Na Lim, Siheung-si (KR); Sung-Ho Choi, Suwon-si (KR); O-Sok Song, Seoul (KR); Jae-Jin Kim, Yongin-si (KR); Eun-Hui Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1218 days.

(21) Appl. No.: 11/429,429

(22) Filed: May 8, 2006

(65) Prior Publication Data

US 2006/0256779 A1 Nov. 16, 2006

(30) Foreign Application Priority Data

May 6, 2005 (KR) ........................ 10-2005-0038179
Aug. 19, 2005 (KR) ........................ 10-2005-0076298

(51) Int. Cl.
*H04W 4/00* (2009.01)
(52) U.S. Cl. ..................... 455/435.2; 455/436; 455/566; 455/567; 455/412.2; 455/552.1; 370/331

(58) Field of Classification Search .............. 455/435.2, 455/436, 566, 567, 412.2, 552.1; 370/331
See application file for complete search history.

(56) References Cited

U.S. PATENT DOCUMENTS

| 5,430,793 | A | * | 7/1995 | Ueltzen et al. | ........... 379/93.29 |
| 5,790,647 | A | * | 8/1998 | Gessel | ................... 379/216.01 |
| 6,424,639 | B1 | | 7/2002 | Lioy et al. | |
| 2001/0031641 | A1 | | 10/2001 | Ung et al. | |
| 2003/0174685 | A1 | * | 9/2003 | Hasebe | ........................ 370/338 |
| 2006/0165064 | A1 | * | 7/2006 | Brown et al. | ................. 370/352 |
| 2006/0194582 | A1 | * | 8/2006 | Cooper | ........................ 455/436 |

FOREIGN PATENT DOCUMENTS

CN 1461130 A 12/2003

* cited by examiner

*Primary Examiner*—Patrick N Edouard
*Assistant Examiner*—Aung Win
(74) *Attorney, Agent, or Firm*—Roylance, Abrams, Berdo & Goodman, L.L.P.

(57) ABSTRACT

A method and apparatus for, upon generation of an event triggering a change in the state of a UE participating in a call, sending service information changed due to the state change to the other participating entity and notifying each user of the service information are provided. When a state change event occurs to a UE, the UE checks its available services and sends a message including service information indicating the available services to the other entity connected to the UE. Therefore, the other entity has knowledge of the actual available services of the UE in a changed environment.

24 Claims, 13 Drawing Sheets

500

OPTIONS+ sip:carol@chicago.com SIP/2.0
    Via: SIP/2.0/UDP pc33.atlanta.com:branch=z9hG4bKhjhs8ass877
    Max-Forwards: 70
    To: <sip:carol@chicago.com>
    From:Alice <sip:alice@atlanta,com>:tag=1928301774
    Call-ID. a84b4c76e66710
    CSeq: 63104 OPTIONS
    Contact: <sip:alice@pc33.atlanta.com>
    Accept.application/sdp
    <u>Supported:CSI available</u>
    Content-Length:0

SIP/2.0 200 OK+
    Via: SIP/2.0.UDP pc33.atlanta.com:branch=z9hG4bKhjhs8ass877
    ;recerved=192.0.2.4
    To: <sip:carol@chicago.com>:tag=93810874
    From: Alice <sip:alice@atlanta.com>:tag=1928301774
    Call-ID: a84b4c76e66710
    CSeq: 63104 OPTIONS
    Contact: <sip:carol@chicago.com>
    Contact: <mailto:carol@chicago.com>
    Allow: INVITE, ACK, CANCLE, OPTIONS,BYE
    Accept: application/sdp
    Accept-Encoding: gzip
    Accept-Language: en
    <u>Supported: CSI available</u>
    Content-Type: application/sdp
    Content-Length: 274

(SDP not shown)

FIG.5B

```
NOTIFICATION DESCRIPTION(OCTET 2)
BITS
7  6  5  4  3  2  1
0  0  0  0  0  0  0      USER SUSPENDED
0  0  0  0  0  0  1      USER RESUMED
0  0  0  0  0  1  0      BEARER CHANGE
x  x  x  x  x  x  x      CSI AVAILABLE

ALL OTHER VALUES ARE RESERVED
```

FIG.6

METHOD AND APPARATUS FOR NOTIFYING CHANGED SERVICE INFORMATION ACCORDING TO TERMINAL STATE IN A WIRELESS COMMUNICATION SYSTEM

CROSS-REFERENCE TO RELATED APPLICATIONS

This application claims priority under 35 U.S.C. §119 to application Serial No. 2005-38179 filed in the Korean Intellectual Property Office on May 6, 2005 and to application Serial No. 2005-76298 filed in the Korean Intellectual Property Office on Aug. 19, 2005, the entire disclosures of both of which are hereby incorporated by reference.

BACKGROUND OF THE INVENTION

1. Field of the Invention

The present invention relates generally to a Combined Circuit Switched (CS) call and Internet Protocol Multimedia Subsystem (IMS) session (hereinafter called CSI). In particular, the present invention relates to a method and apparatus for sending service information, which was changed due to a change of the state of a User Equipment (UE), to another peer entity connected to the UE.

2. Description of the Related Art

Circuit switching is used for typical voice service. The CS is a scheme in which a CS-based communication path is established between one user and another user. In comparison, IMS uses a packet-based variable communication path over IP, thus increasing transmission efficiency and ensuring stability. IMS supports a multiparty call as well as a one-to-one call.

Global System for Mobile communications (GSM) and Enhanced Data Rates GSM Evolution (EDGE) Radio Access Network (GERAN) basically support CS calls. Terrestrial Radio Access Network (UTRAN) of Universal Mobile Telecommunications System (UMTS) based on GSM supports IMS-based multimedia service as well as CS calls. For example, when a dual-mode terminal capable of accessing GERAN and UTRAN is connected to a CS call in a plane GERAN area and moves to a UTRAN area at handover, the UE can concurrently use the CS call and an enhanced PS service including messaging or file transfer.

When the state of the UE connected to the other peer entity changes as in the above case, services available to the participating users may also be changed. However, there is no specified method of notifying the participating users (i.e. entities) of the services now available.

As an associated conventional technique, there is a method of exchanging information indicating whether a service is available when a connection starts. Specifically, information indicating the radio states of participating users is exchanged between the users during call setup in CSI service. The CSI service uses a CS call for voice call and an IMS session for an enhanced PS service including messaging or file transfer. A CSI terminal and a CS/PS dual-mode terminal can support the CSI service. As described above, since the CSI service is implemented over both a CS network and a PS network (including an IMS domain), it is available in a Dual Transfer Mode (DTM) GERAN or UTRAN area. The radio capability of the area where the UE is located is equivalent to the service availability of the area in the CSI service.

FIG. 1 is a diagram illustrating a signal flow for a radio capability exchange procedure for a CSI service. Both a UE 100 (UE-A) and a UE 110 (UE-B) support the CSI service or a CS/PS dual mode. UE-A accesses an IMS core network 104 (IMS core network-A) via a CS domain 102 (CS domain-A), and UE-B accesses an IMS core network 106 (IMS core network-B) via a CS domain 108 (CS domain-B).

Referring to FIG. 1, UE-A sends information about the current radio environment of the area where UE-A is located in a SETUP message for a CS call toward UE-B in step 112. CS domain-A to which UE-A is connected sends an Initial Address Message (IAM) message including the current radio environment information to CS domain-B to which UE-B is connected in step 114. CS domain-B sends a SETUP message including the current radio environment information to UE-B in step 116. UE-B stores the current radio environment information with respect to UE-A. In step 118, UE-B sends a CONNECT message including the current radio environment information of the area where UE-B is located toward UE-A in step 118. CS domain-B sends the current radio environment information in a CON message to CS domain-A in step 120 and CS domain-A sends the current radio environment information in a CONNECT message to UE-A in step 122. UE-A also stores the current radio environment information with respect to UE-B.

In this way, both UEs get knowledge of the radio capabilities of their current areas, in other words available CSI services. However, when the state of one UE is changed after call setup, for example as occurs in handover, the other participating users in the connection are not aware that the services available have changed. Consequently, even when a PS service is available, the users are not aware and the PS service is not provided, thus the users' demand is not fulfilled.

Accordingly, there is a need for an improved method and apparatus for notifying of a change in service information according to a state in a wireless terminal.

SUMMARY OF THE INVENTION

An exemplary object of the present invention is to address at least the above problems and/or disadvantages and to provide at least the advantages below. Accordingly, exemplary embodiments the present invention provide a method and apparatus for notifying a participating UE of the changes in types of services available due to the change of a first UE's state.

Exemplary embodiments of the present invention also provide a method and apparatus for, upon occurrence of an event triggering change of the state of a UE participating in a call, checking the UE's available services and sending service information indicating the available services to other participating UEs.

According to one exemplary aspect of the present invention, in a method of notifying that service information changed according to the state of a first UE (UE-A) in a wireless communication system, a connection is established with a second UE (UE-B) and a service is received by the connection. Upon generation of an event triggering a change in the state of UE-A during the service, an available service list for UE-A (UE-ASL-A) is updated according to the state change, and service information indicating the updated UE-ASL-A is sent to UE-B.

According to another exemplary aspect of the present invention, in a method of receiving service information changed according to the state of a first UE (UE-A) in a second UE (UE-B) in a wireless communication system, a connection is established with UE-A and a service is received by the connection. Upon generation of an event triggering a change in the state of UE-A during the service, service information indicating an available service list for the UE (UE- ASL-A) according to the state change is received from UE-A. A list of common available services (ASL) is updated by comparing UE-ASL-A with a list of available services for UE-B (UE-ASL-B) and notifying a user, while maintaining the connection.

According to a further exemplary aspect of the present invention, in a method of notifying that service information changed according to the state of a UE in a network apparatus in a wireless communication system, a connection is established between a first UE (UE-A) and a second UE (UE-B) through the network apparatus and a service is provided by the connection. Upon generation of an event triggering a change in the state of UE-A during the service, service information indicating a list of available services for UE-A (UE-ASL-A) according to the state change is received from UE-A and sent to UE-B through another network apparatus connected to UE-B.

According to still another exemplary aspect of the present invention, in a method of notifying that service information changed according to the state of a first UE (UE-A) in a wireless communication system, a connection is established to a second UE (UE-B) and a service is received by the connection. Upon generation of an event triggering a change in the state of the UE during the connection, an available service list for UE-A (UE-ASL-A) according to the state change is updated and compared with an available service list for UE-B (UE-ASL-B). If there is a change in a list of common available services (ASL) according to the comparison result, the ASL is updated, sent to UE-B, and a user is notified, while the connection is maintained.

According to yet another exemplary aspect of the present invention, in a method of notifying that service information changed according to the state of a UE in a network apparatus in a wireless communication system, a connection is established between a first UE (UE-A) and a second UE (UE-B) through the network apparatus and a service is provided by the connection. Upon generation of an event triggering a change in the state of UE-A during the connection, service information indicating a list of common available services for UE-A and UE-B (ASL) according to the state change is received from UE-A and sent to UE-B through another network apparatus connected to UE-B.

BRIEF DESCRIPTION OF THE DRAWINGS

The above and other objects, features and advantages of exemplary embodiments of the present invention will become more apparent from the following detailed description when taken in conjunction with the accompanying drawings in which:

FIGS. 5A and 5B illustrate the structures of OPTIONS+ and 200 OK+ messages, respectively according to an exemplary embodiment of the present invention;

FIG. 6 illustrates the structure of a NOTIFY message according to an exemplary embodiment of the present invention;

Throughout the drawings, the same drawing reference numerals will be understood to refer to the same elements, features, and structures.

DETAILED DESCRIPTION OF THE EXEMPLARY EMBODIMENTS

Figure 1:
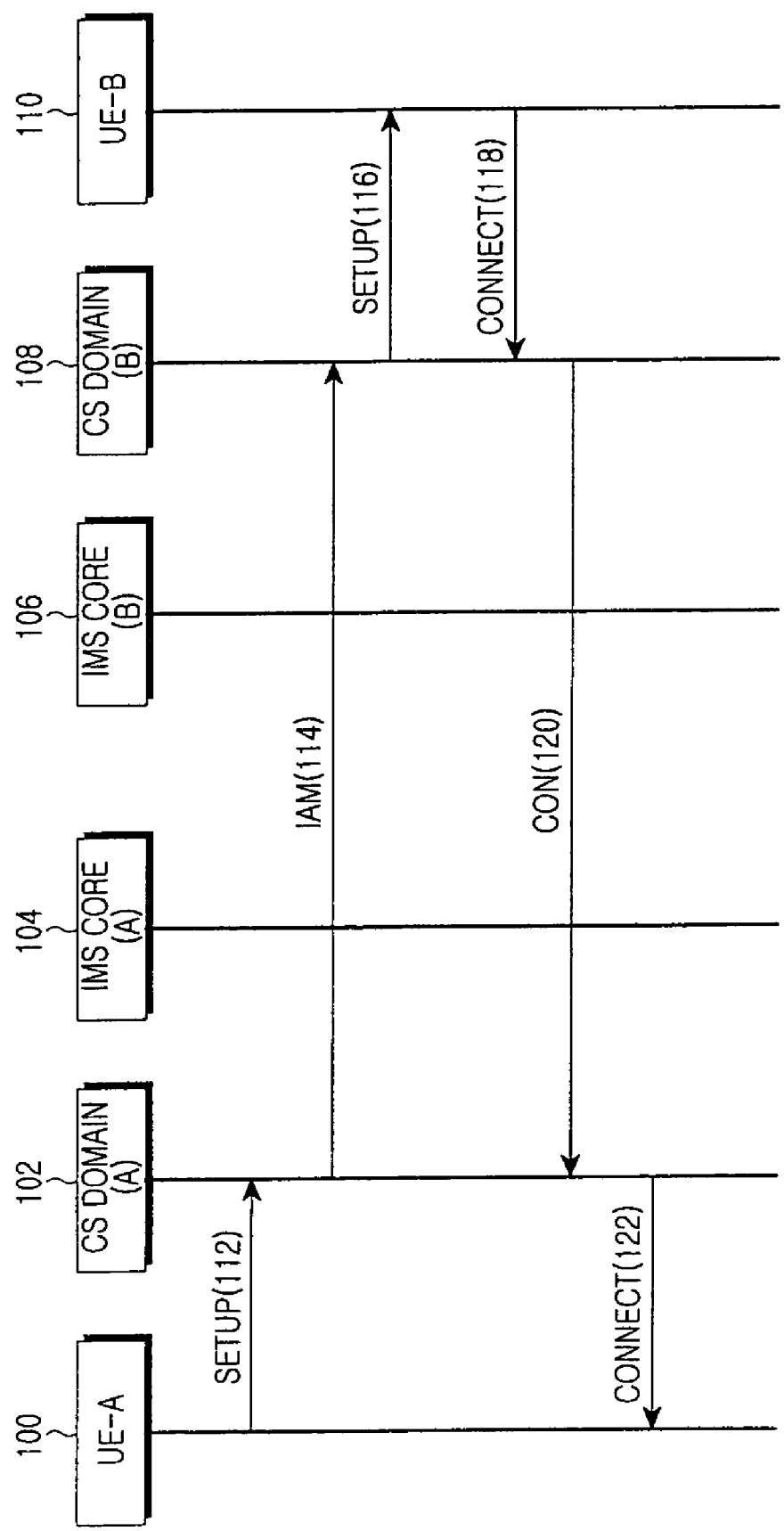
FIG. 1 is a diagram illustrating a signal flow for a radio capability exchange procedure for a CSI service.

Exemplary embodiments of the present invention will be described herein below with reference to the accompanying drawings. In the following description, well-known functions or constructions are not described in detail since they would obscure the invention in unnecessary detail.

An exemplary embodiment of the present invention comprises a method wherein, when an event triggering a state change occurs to a UE, the UE checks the available services and sends to the other entity connected to the UE a message including information indicating the available services so that the other entity can find out what services are really available to the UE. The term used hereinbelow, "a service information notification" is a procedure for notifying another entity of service information indicating available services after a state change.

The other entity can be any type of entity or network node that can be connected to a UE, such as another UE. While the other entity is described as a UE for notational simplicity, clearly it does not limit the scope of the present invention. Hereinbelow, one entity is called UE-A and the other entity is called UE-B.

UE states are defined as a set of characteristics representing the environment of the UE participating in a connection. The characteristics include GERAN, DTM GERA, and UTRAN areas, PS domain barring, data rate, and IMS service availability. Barring means that an operator restricts a UE from using a predetermined service (e.g. PS service) within a particular cell. For example, when a particular cell cannot accept a service request from a UE due to limits in the PS service capability of the cell, this is called operator PS service barring. A state change is triggered by an event. The event can be handover, PS attachment/detachment, IMS registration, a change of situations in an area where a user receives a service, a change of service provider policy, or the like. The state change may or may not cause a change in the services available to UEs.

A UE-ASL is a list of services currently available to a UE. After the state of the UE is changed, the UE-ASL is updated. The UE-ASL is a service list previously compared with the UE-ASL of the other party, and comprises services selected from a UE Supported Service List (UE-SSL). The UE-SSL is a list of services which are preset according to the capability of the UE, the types of services that the UE has subscribed to and the system has allowed for the UE and the like. Thus, the UE-SSL is a list of all services supported by the UE. The UE-SSL can be updated by the user or a service operator. The UE-ASL of UE-A is denoted by UE-ASL-A and the UE-ASL of UE-B is denoted by UE-ASL-B.

An ASL is defined as a list of services common to UE-ASL-A and UE-ASL-B. Hence, the ASL is a list of services available by the connection between UE-A and UE-B. The ASL may include a higher-layer service like a CS service or a PS service, or classified PS services such as Multimedia Messaging Service (MMS) and File Transfer Protocol (FTP). Each participating UE notifies a corresponding user of the ASL so that the UE can select a desired service. Alternatively, each UE automatically selects and implements an optimal service according to a pre-programmed selection criterion from the ASL.

The afore-mentioned ASL, UE-ASL, and UE-SSL are UE-associated service information that can be stored in the UE, for future reference.

The present invention presents two exemplary embodiments regarding service information notification. One exemplary embodiment is characterized by exchange of UE-ASLs during exchange of service information, and the other exemplary embodiment is characterized by exchange of ASLs during exchange of service information.

EXEMPLARY EMBODIMENT 1

Figure 2:
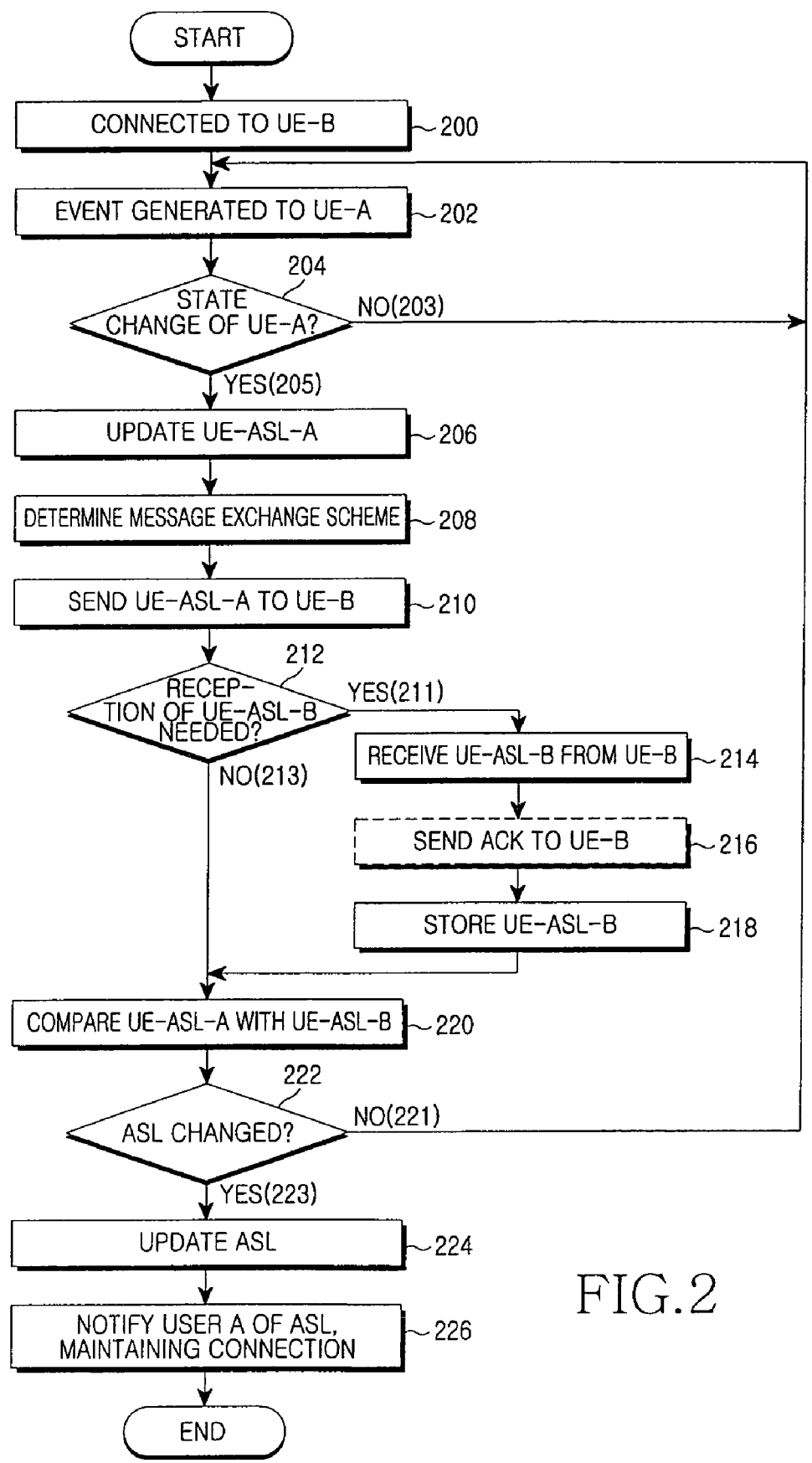
FIG. 2 is a flowchart illustrating an operation of UE-A for, when an event occurs to UE-A connected to UE-B, notifying each user of the UE Available Service List (UE-ASL) of UE-A according to a first exemplary embodiment of the present invention.

FIG. 2 is a flowchart illustrating a UE-A operation for notifying a user of an ASL when a state change event occurs to UE-A connected to UE-B according to an exemplary embodiment of the present invention.

Referring to FIG. 2, a connection has been established between UE-A and UE-B in step 200. UE-A and UE-B receive a service such as a voice call. Upon generation of an event to UE-A in step 202, UE-A determines whether the event has triggered a change in the state of UE-A in step 204. If the state of UE-A is kept unchanged as indicated by reference numeral 203, UE-A returns to step 202. If the state of UE-A has been changed as indicated by reference numeral 205, UE-A checks UE-ASL-A associated with the state change and stores UE-ASL-A in step 206. This UE-ASL-A is a list of services that UE-A can support after the state change.

Figure 4:
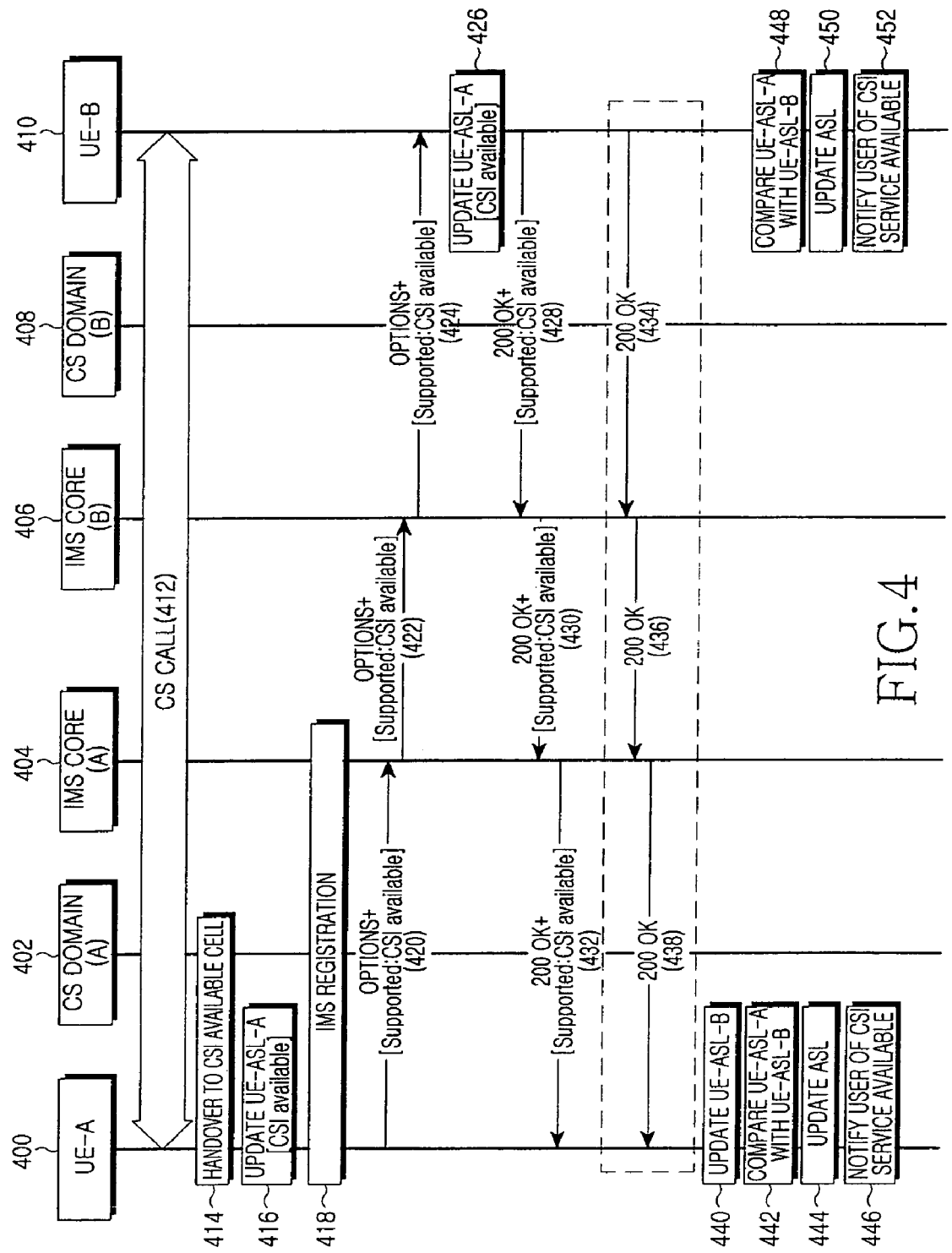
FIG. 4 is a diagram illustrating IMS signaling according to the first exemplary embodiment of the present invention.
Figure 7:
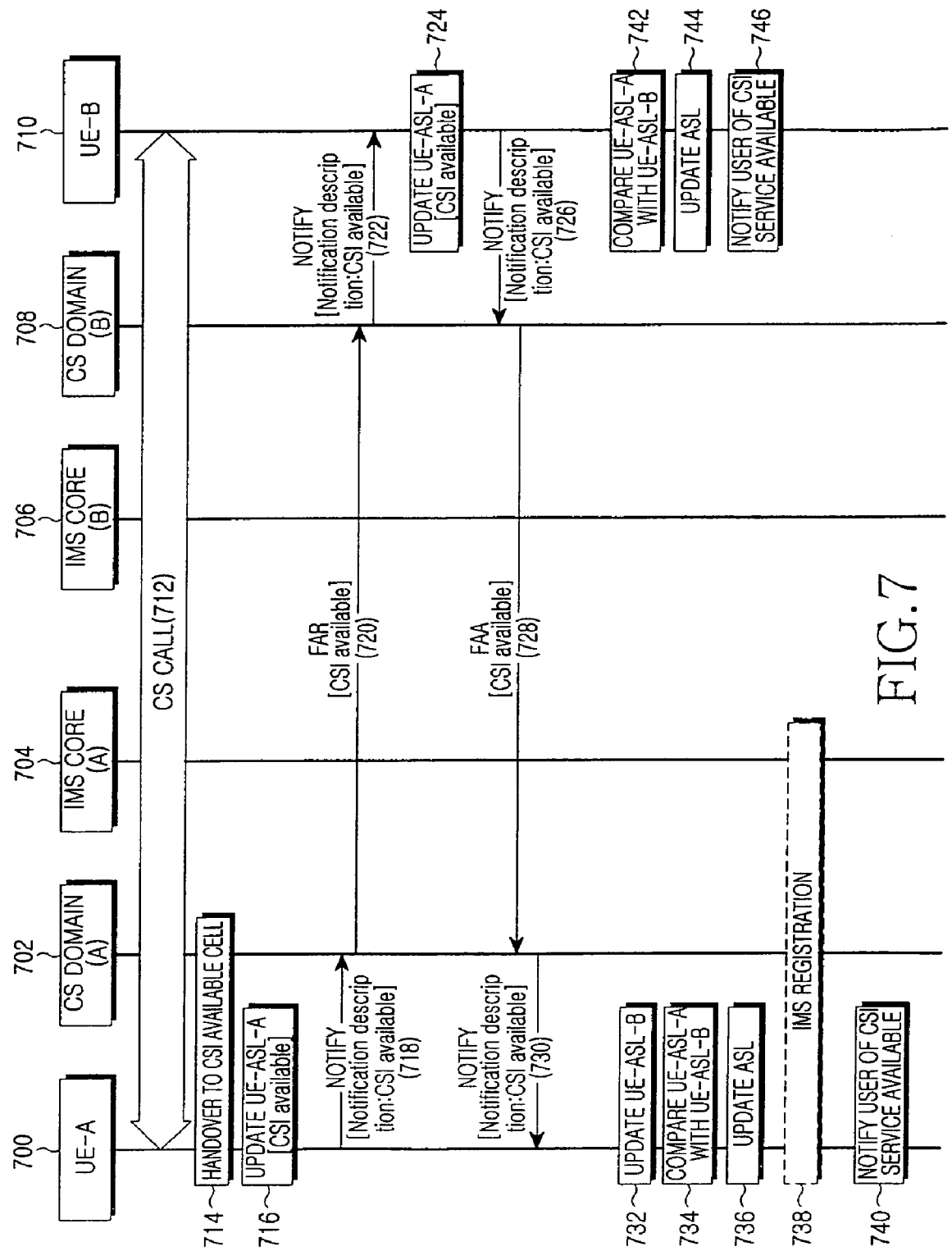
FIG. 7 is a diagram illustrating CS signaling according to the first exemplary embodiment of the present invention.

In step 208, UE-A decides as to how messages are to be exchanged and performs an associated procedure, in order to send UE-ASL-A to UE-B. The message exchange scheme depends on the preference of the user or the operator. The message exchange scheme can be selected by the user or the operator upon generation of every event, or once a message exchange scheme is selected upon generation of the first event, it is continuously used. In accordance with the exemplary embodiment, CS signaling and IMS signaling are examples of message exchange schemes. The CS signaling and IMS signaling are shown in FIGS. 7 and 4, respectively.

In step 210, UE-A sends UE-ASL-A to UE-B according to the decided message exchange scheme. UE-A determines whether to receive UE-ASL-B in step 212. In a case where UE-B has experienced no state change and thus UE-A does not have UE-ASL-B, UE-A needs to receive UE-ASL-B as indicated by reference numeral 211. In this case, UE-A receives UE-ASL-B from UE-B according to the message exchange scheme in step 214, stores it in step 218, and proceeds to step 220. In step 216, UE-A can send an ACKnowledgement (ACK) signal to UE-B, notifying successful reception of UE-ASL-B. On the other hand, in case where UE-A already has UE-ASL-B, UE-A does not need to receive UE-ASL-B, as denoted by reference numeral 213. In this case, UE-ASL-A directly goes to step 220.

UE-A compares UE-ASL-A with UE-ASL-B in step 220 and determines whether to change the ASL according to the comparison result in step 222. If there is no change in the ASL as denoted by reference numeral 221, UE-A returns to step 202. If the ASL is to be changed as denoted by reference numeral 223, UE-A updates the ASL in step 224. The ASL is a list of services that both UE-A and UE-B can commonly support and thus that are common to UE-ASL-A and UE-ASL-B. In step 226, UE-A sends the updated ASL to the user of UE-A, user A, while maintaining the existing connection. Alternatively, UE-A transitions to a service selected from the updated ASL according to a program which may be pre-stored.

Figure 3:
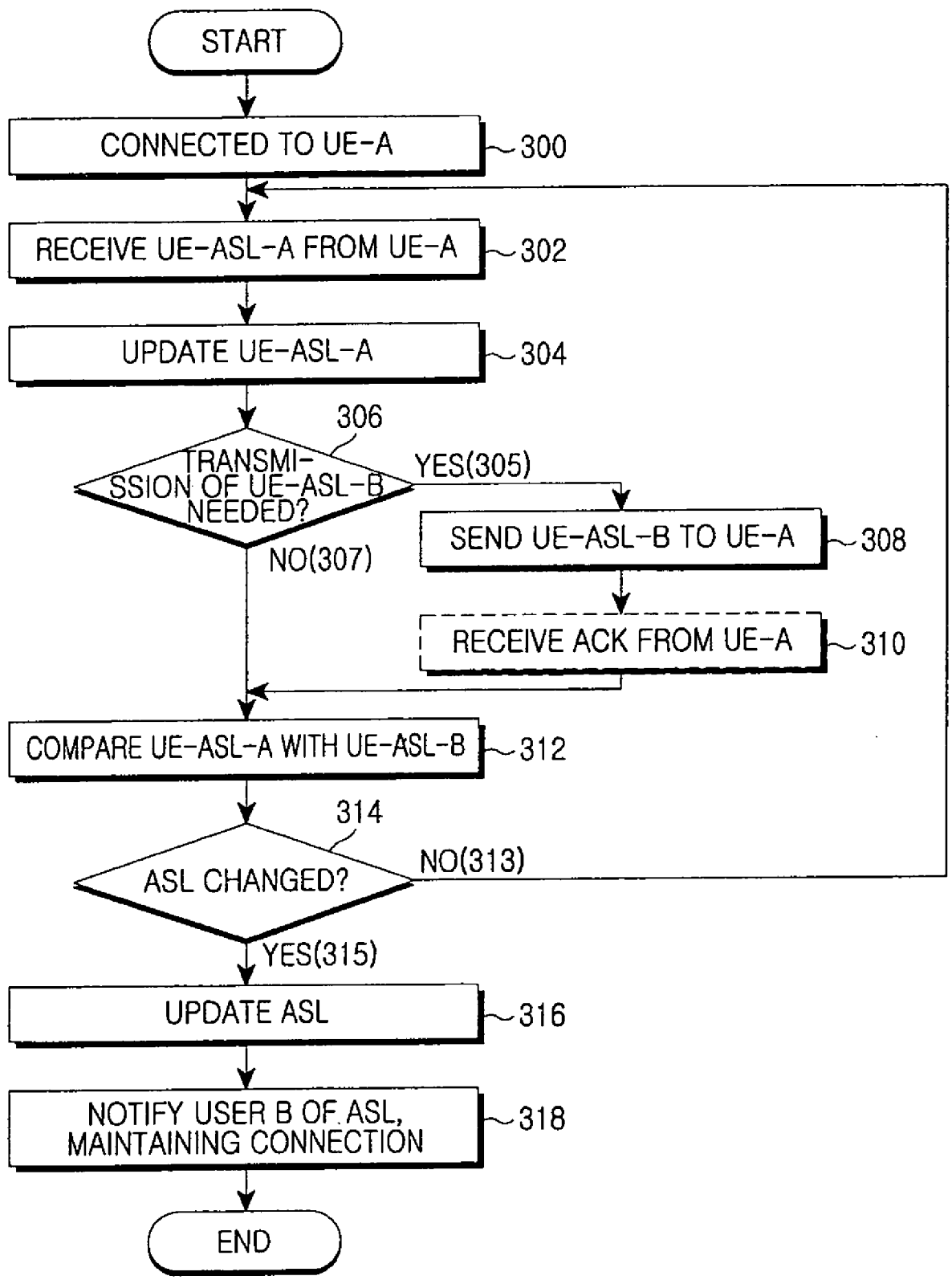
FIG. 3 is a flowchart illustrating an operation of UE-B according to the first exemplary embodiment of the present invention.

FIG. 3 is a flowchart illustrating an operation of UE-B according to the first exemplary embodiment of the present invention.

Referring to FIG. 3, a connection has been established between UE-A and UE-B in step 300. UE-B receives UE-ASL-A from UE-A in step 302 and replaces a stored UE-ASL-A with the received UE-ASL-A, that is, updates UE-ASL-A in step 304. In step 306, UE-B determines whether to send UE-ASL-B. If UE-ASL-B needs to be sent, UE-B sends UE-ASL-B in step 308 and proceeds to step 312. In step 310, UE-B may receive an ACK signal indicating successful reception of UE-ASL-B from UE-A. On the contrary, if there is no need for sending UE-ASL-B, UE-B directly goes to step 312.

UE-B compares UE-ASL-A with UE-ASL-B in step 312 and determines whether to change the ASL according to the comparison result in step 314. If there is no change in the ASL as denoted by reference numeral 313, UE-B returns to step 302. If the ASL is to be changed as denoted by reference numeral 315, UE-B updates the ASL in step 316. In step 316, UE-B notifies the updated ASL to the user of UE-B, user B, while maintaining the existing connection. Alternatively, UE-B transitions to a service selected from the updated ASL according to a pre-stored program. The program is so configured as to implement the same service in both UE-A and UE-B.

As described above, the ASL for the connection between UE-A and UE-B is updated, while maintaining the connection, and the updated ASL is notified to the users associated with the connection. The notification can be made on a display or by voice.

A description will be made below of an operation according to an exemplary embodiment of the present invention when UE-A moves from a CS area to a CSI area.

FIG. 4 is a diagram illustrating IMS signaling according to the first exemplary embodiment of the present invention. A CSI service is available to a UE 400 (UE-A) and a UE 410 (UE-B). UE-A uses a CS domain 402 (CS domain-A) for a CS call and uses an IMS core network 404 (IMS core network-A) for an IMS call. Similarly, UE-B uses a CS domain 408 (CS domain-B) for a CS call and uses an IMS core network 406 (IMS core network-B) for an IMS call.

Referring to FIG. 4, UE-A and UE-B are conducting a CS speech call in step 412. As UE-A implements a handover by moving into a CSI area (e.g. a UTRAN area) in step 414, UE-A updates UE-ASL-A so that it contains CSI available information in step 416. The CSI available information indicates that the CSI service is available in a current state. UE-A determines to exchange messages with UE-B by IMS signaling. If UE-A is not IMS-registered, UE-A performs IMS registration to IMS core network-A in step 418. In step 420, UE-A sends UE-ASL-A in the Supported header of an OPTIONS+ message to UE-B. If UE-ASL-A contains only the CSI available information, UE-ASL-A is identical to the CSI available information in the exemplary embodiment of the present invention. In other words, UE-A includes the entire UE-ASL-A or the CSI available information being the variation of UE-ASL-A in the OPTIONS+ message.

The OPTIONS+ message is a modified version of an OPTIONS message defined by Session Initiation Protocol (SIP). The OPTIONS+ message is used to query the capability of the other party and its response message is 200 OK. In accordance with the exemplary embodiment of the present invention, both the OPTIONS message and the OPTIONS+ message can be used. In case of the OPTIONS message, when UE-A sends the OPTIONS message to UE-B, UE-B sends CSI available information ("CSI available") in the "Supported" header of the 200 OK message. If UE-B sends the OPTIONS message to UE-A, UE-A sends the CSI available information (Supported: CSI available) in the Supported header of the 200 OK message. In case of the OPTIONS+ message, it further includes a Supported header having service information notification functionality. That is, the OPTIONS+ message can have the service information of a transmitter as well as a simple query in the Supported header.

FIG. 5A illustrates the structure of the OPTIONS+ message according to an exemplary embodiment of the present invention. Referring to FIG. 5A, an OPTIONS+ message 500 further includes a Supported header in addition to the typical OPTIONS message. The Supported header provides the service information of a transmitter, for example, CSI available information.

Referring to FIG. 4 again, upon receipt of the OPTIONS+ message, the IMS core network-A forwards the OPTIONS+ message to IMS core network-B in step 422 and IMS core network-B also forwards the OPTIONS+ message to UE-B in step 424. In step 426, UE-B updates a stored UE-ASL-A with the CSI available information extracted form the OPTIONS+ message. If UE-B needs to send UE-ASL-B to UE-A, it sends UE-ASL-B in a 200 OK+ message to UE-A in steps 428, 430 and 432. The 200 OK+ message is equivalent to an ACK signal for the OPTIONS+ message. If UE-ASL-B contains only CSI available information, UE-ASL-B is identical to the CSI available information. In other words, UE-B includes the entire UE-ASL-B or the CSI available information being the variation of UE-ASL-B in the 200 OK+ message.

The 200 OK+ message is constructed by adding a Supported header with the service information notification functionality to the typical SIP 200 OK message. FIG. 5B illustrates the structure of the 200 OK+ message according to the exemplary embodiment of the present invention. Referring to FIG. 5B, a 200 OK+ message 502 further includes a Supported header in addition to the typical 200 OK message. The Supported header includes the service information of a transmitter, for example, CSI available information (Supported: CSI available). If there is no need for sending UE-ASL-B, UE-B sends the typical 200 OK message as an ACK signal to UE-A in steps 434, 436 and 438.

After receiving the 200 OK+ or 200 OK message, UE-A updates UE-ASL-B, when needed in step 440, compares UE-ASL-A with UE-ASL-B in step 442, and updates an ASL in step 444. UE-B also compares UE-ASL-A with UE-ASL-B in step 448, and updates the ASL in step 450. In steps 446 and 452, UE-A and UE-B notify their users that the CSI service is available. Upon user request, a corresponding UE sends a call setup request for the CSI service to the other party.

CS signaling for message exchange between UE-A and UE-B will be described now. UE-A sends service information to UE-B by a NOTIFY message. The NOTIFY message is a No. 7 signaling message used to deliver particular information to the other party without affecting an on-going CS call. It is unidirectional. In accordance with an exemplary embodiment of the present invention, changed service information is added to the Notification description of the NOTIFY message.

FIG. 6 illustrates the structure of the NOTIFY message according to an exemplary embodiment of the present invention. Referring to FIG. 6, User suspended, User resumed, Bearer change, and CSI available are defined, each in a 7-bit value for a Notification description field in the NOTIFY message. In the illustrated case of FIG. 6, User suspended, User resumed, and Bearer change are set to 0000000, 0000001, and 0000010. CSI available is set to 'xxxxxxx' being a bit combination other than the bit combinations used for the above other purposes.

Besides the available service indication, the NOTIFY message may provide a variety of information associated with the available service. For example, in the CSI service, 'CSI-384 kbps' as well as 'CSI available ' can be indicated in the Notification description.

FIG. 7 is a diagram illustrating CS signaling according to the first exemplary embodiment of the present invention. A CSI service is available to a UE 700 (UE-A) and a UE 710 (UE-B). UE-A uses a CS domain 702 (CS domain-A) for a CS call and uses an IMS core network 704 (IMS core network-A) for an IMS call. Similarly, UE-B uses a CS domain 708 (CS domain-B) for a CS call and uses an IMS core network 706 (IMS core network-B) for an IMS call. The NOTIFY message uses a Facility Request (FAR) message and a Facility Accepted (FAA) message as an ISDN (Integrated Services Digital Network) User Part (ISUP).

Referring to FIG. 7, UE-A and UE-B are conducting a CS speech call in step 712. As UE-A implements a handover to a CSI area (e.g. a UTRAN area) in step 714, UE-A updates UE-ASL-A so that it contains CSI available information in step 716. Here, UE-A determines to exchange messages with UE-B by CS signaling.

In step 718, UE-A sends UE-ASL-A (or the CSI available information) in a NOTIFY message to CS domain-A. CS domain-A sends UE-ASL-A in the User to User Information (UUI) field of a FAR message to CS domain-B in step 720, and CS domain-B includes the FAR message in a NOTIFY message and sends the NOTIFY message to UE-B in step 722. In step 724, UE-B updates a stored UE-ASL-A with UE-ASL-A extracted form the NOTIFY message. UE-B then sends UE-ASL-B in a NOTIFY message toward UE-A in step 726. CS domain-B sends UE-ASL-B in the UUI field of an FAA message to CS domain-A in step 728 and CS domain-A sends a NOTIFY message including UE-ASL-B to UE-A in step 730. If there is no need for sending UE-ASL-B, steps 726, 728 and 730 are not performed.

UE-A updates UE-ASL-B, when needed in step 732, compares UE-ASL-A with UE-ASL-B in step 734, and updates an ASL in step 736. If UE-A has not been registered to IMS core network-A, it performs IMS registration to IMS core network-A in step 738. UE-B also compares UE-ASL-A with UE-ASL-B in step 742 and updates the ASL in step 744. In steps 740 and 746, UE-A and UE-B send the updated ASL to their users to notify that the CSI service is available.

Each UE can send periodically the OPTIONS or OPTIONS+ message to trace the state of the other party. In case of the CSI service, if the other UE moves from a UTRAN area to a plane GERAN area by handover, the user can find out that the CSI service is unavailable by sending the OPTIONS or OPTIONS+ message. For example, if UE-B does not reply to the OPTIONS/OPTIONS+ message sent from UE-A, UE-A determines that UE-B has moved to a CSI unavailable area by handover and correspondingly notifies the user A. That is, each UE traces the state of the other party by periodically sending the OPTIONS/OPTIONS+ message.

EXEMPLARY EMBODIMENT 2

ASLs are exchanged during exchange of service information.

Figure 8:
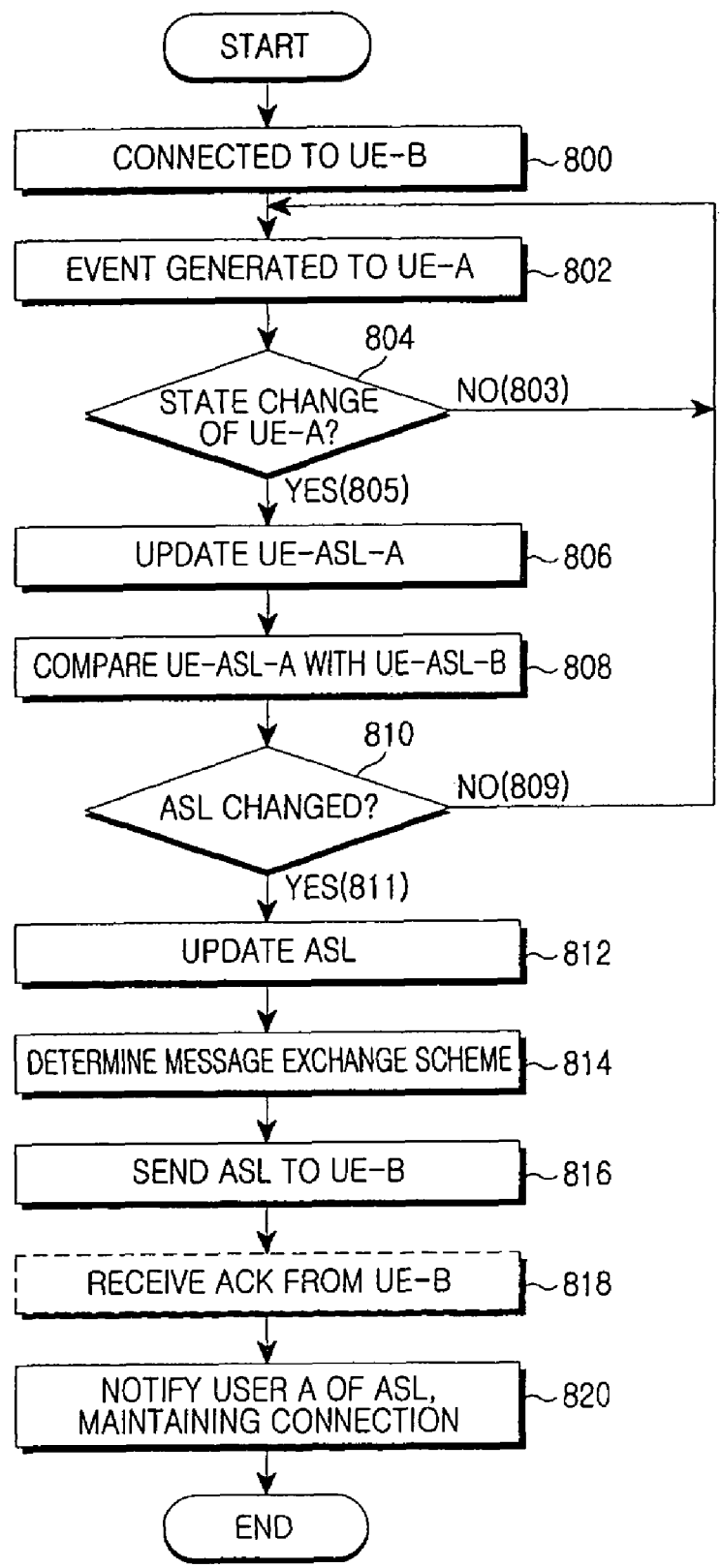
FIG. 8 is a flowchart illustrating an operation of UE-A for, when an event occurs to UE-A connected to UE-B, notifying each user of the UE-ASL of UE-A according to a second exemplary embodiment of the present invention.

FIG. 8 is a flowchart illustrating a UE-A operation for notifying a user of an ASL when a state change event occurs to UE-A connected to UE-B according to another exemplary embodiment of the present invention.

Referring to FIG. 8, a connection has been established between UE-A and UE-B in step 800. Upon generation of an event to UE-A in step 802, UE-A determines whether the event has triggered a change in the state of UE-A in step 804. In the absence of a state change as denoted by reference numeral 803, UE-A returns to step 802 to monitor generation of an event. In the presence of a state change as denoted by reference numeral 805, UE-A checks a change in UE-ASL-A caused by the state change and updates UE-ASL-A in step 806 and compares a stored UE-ASL-B with the updated UE-ASL-A in step 808. In step 810, UE-A determines whether a change has occurred to an ASL according to the comparison result. In case of an ASL change as denoted by reference numeral 811, UE-A updates the ASL in step 812. If the ASL is not changed as denoted by reference numeral 809, UE-A returns to step 802. If UE-A does not have UE-ASL-B, UE-A can perform the service information notification procedure as in the first exemplary embodiment of the present invention.

Figure 10:
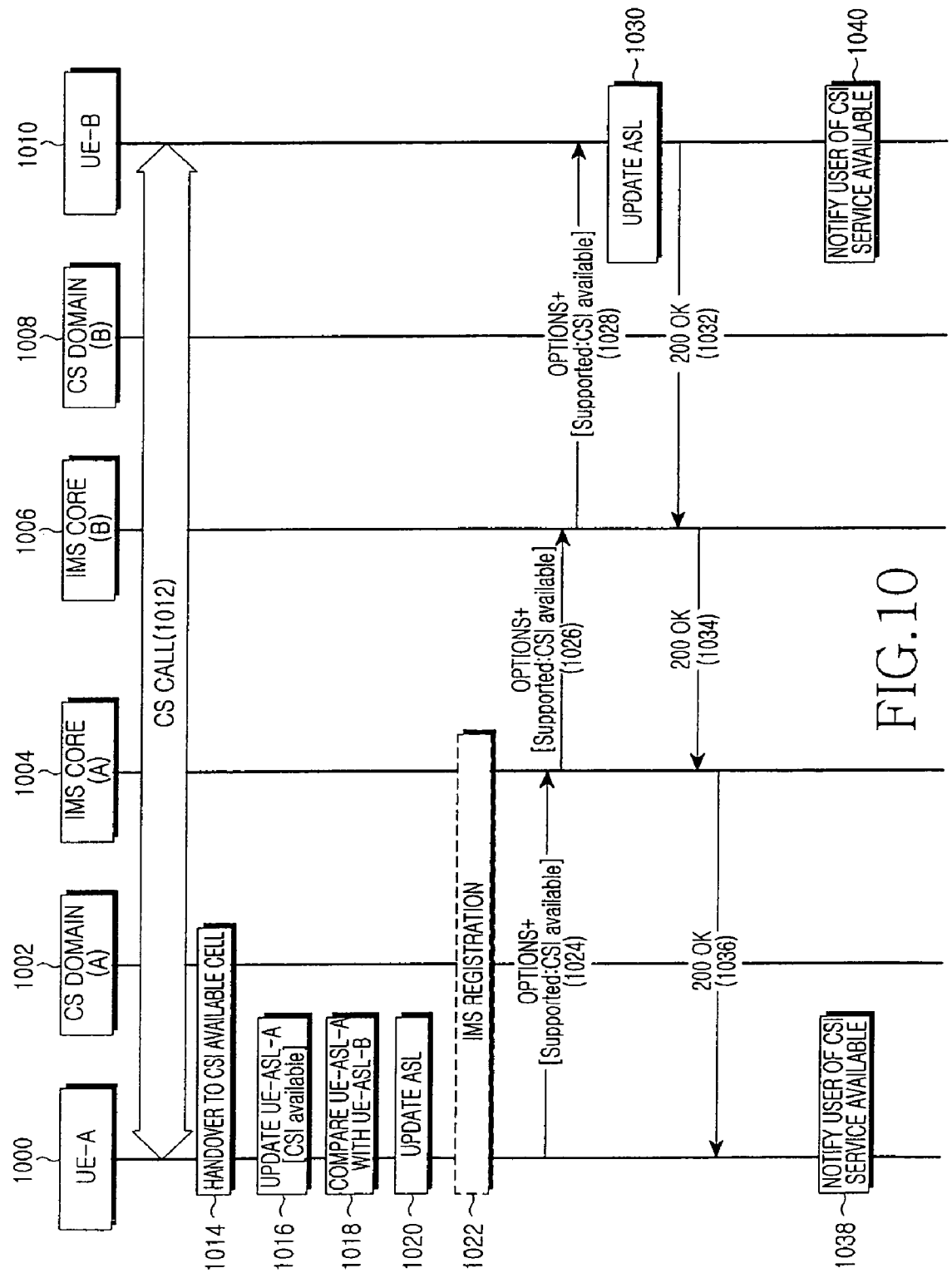
FIG. 10 is a diagram illustrating IMS signaling according to the second exemplary embodiment of the present invention.
Figure 11:
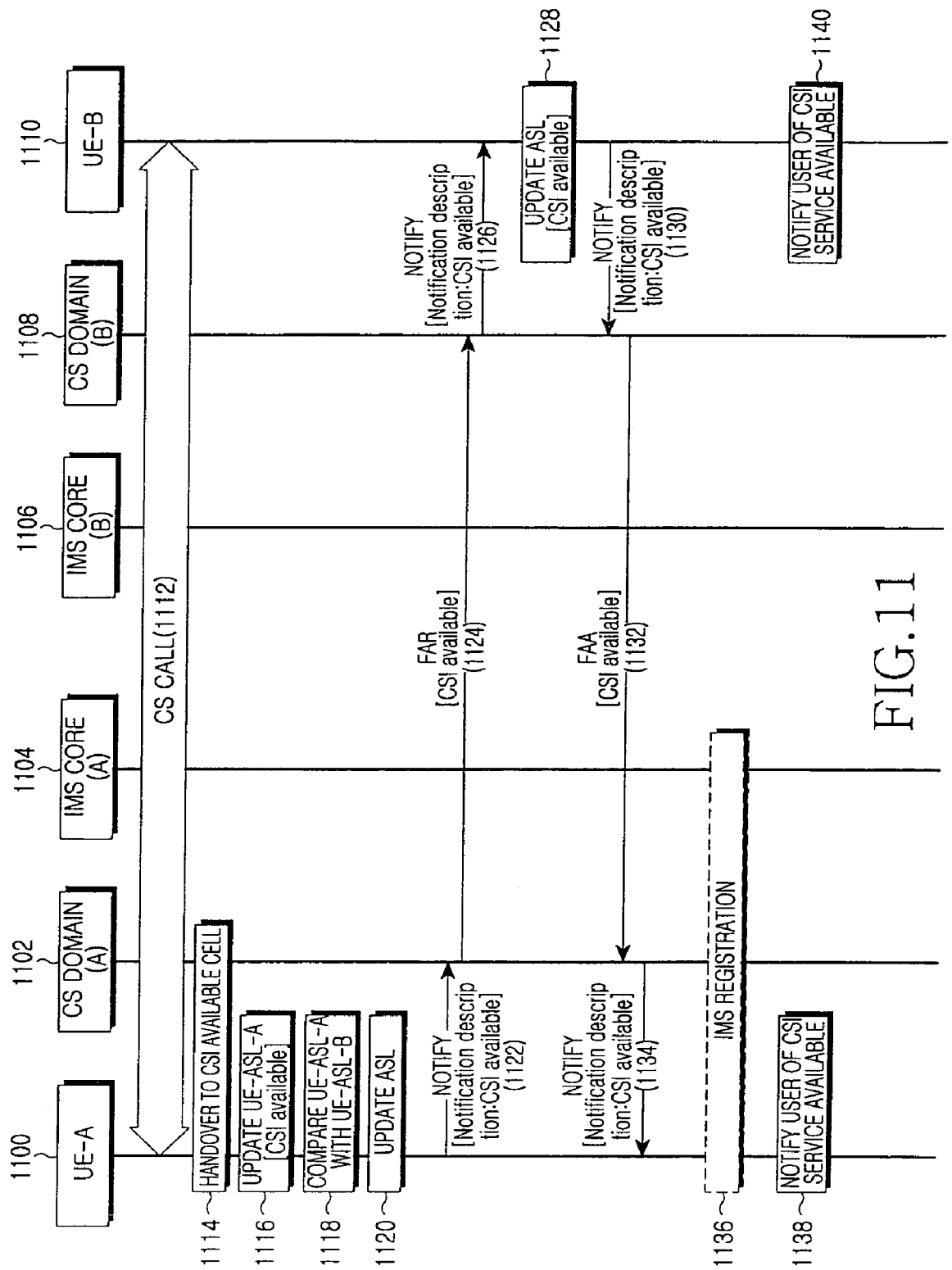
FIG. 11 is a diagram illustrating an example of CS signaling according to the second exemplary embodiment of the present invention.
Figure 12:
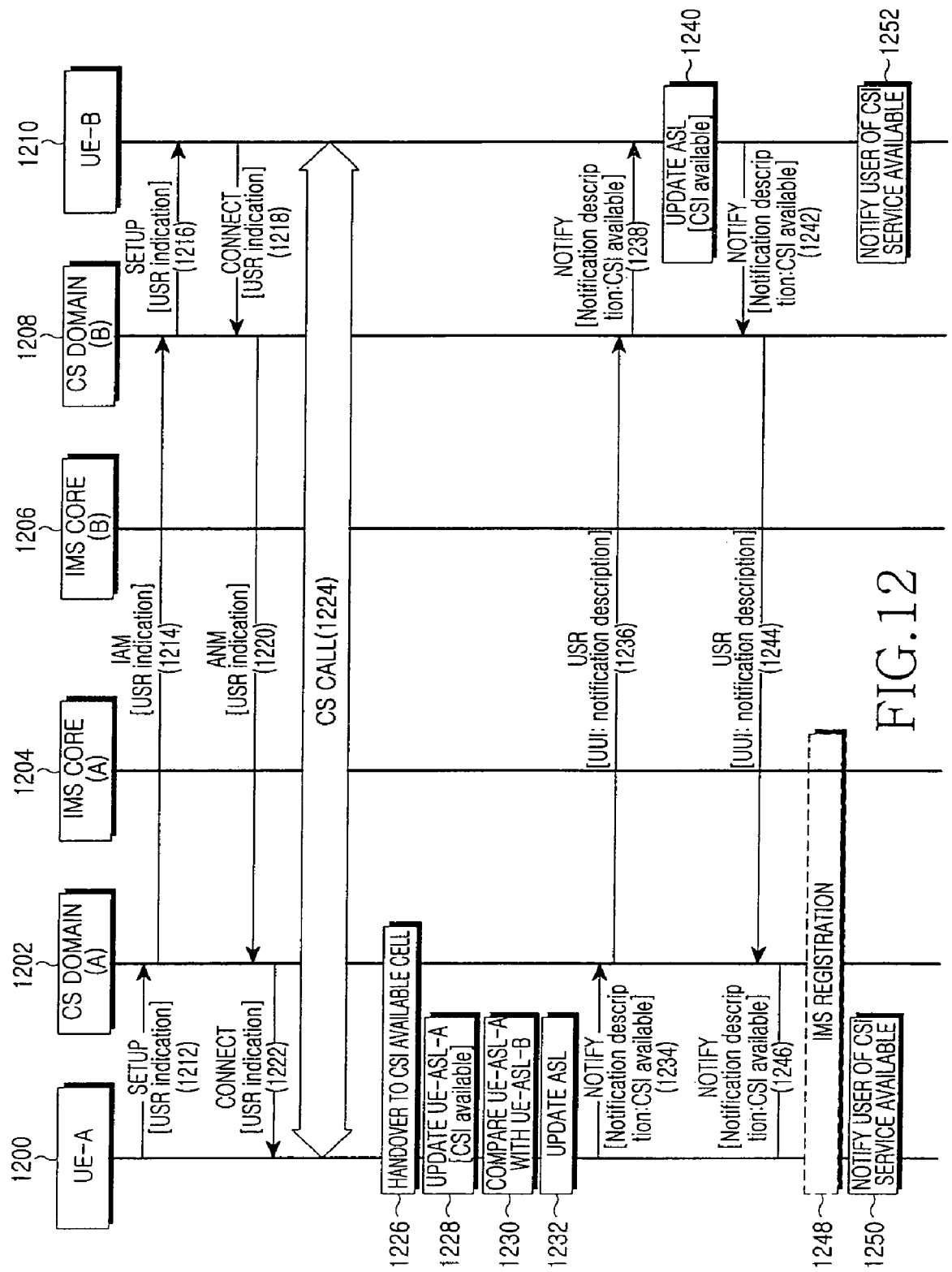
FIG. 12 is a diagram illustrating another example of CS signaling according to the second exemplary embodiment of the present invention.

In step 814, UE-A selects a message exchange scheme, for example IMS signaling and CS signaling to send the ASL to UE-B and operates according to the selected message exchange scheme. A message exchange by IMS signaling is shown in FIG. 10, and a message exchange by CS signaling is shown in FIGS. 11 and 12. UE-A sends the ASL to UE-B in step 816 and notifies the user of the ASL in step 820. In step 818, UE-A may receive an ACK signal indicating successful reception of the ASL from UE-B. During the above steps, the connection of step 800 is kept.

Figure 9:
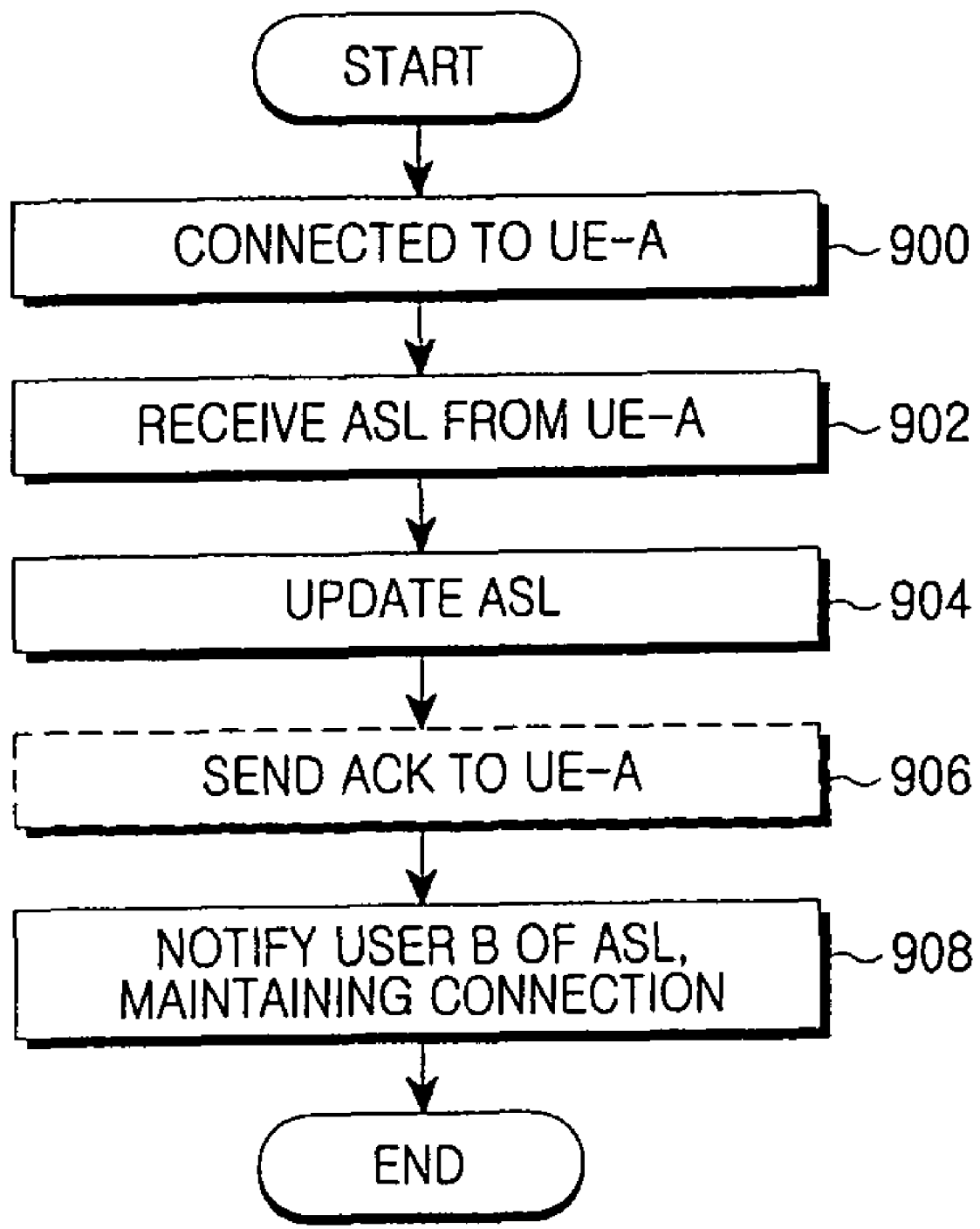
FIG. 9 is a flowchart illustrating an operation of UE-B according to the second exemplary embodiment of the present invention.

FIG. 9 is a flowchart illustrating an operation of UE-B according to the second exemplary embodiment of the present invention.

Referring to FIG. 9, a connection has been established between UE-A and UE-B in step 900. UE-B receives an ASL from UE-A in step 902, updates a stored ASK with the received ASL in step 904, and notifies the user of the updated ASL in step 908. In step 906, UE-B may send an ACK signal indicating successful reception of the ASL to UE-A. During the above steps, the connection of step 900 is still kept.

A description will be made below of an operation according to the exemplary embodiment of the present invention when UE-A moves from a CS area to a CSI area, to which the present invention is not limited.

FIG. 10 is a diagram illustrating IMS signaling according to the second exemplary embodiment of the present invention. A UE to which an event has occurred sends a changed ASL to the other UE, rather than each UE compares its UE-ASL with a received UE-ASL. A CSI service is available to a UE 1000 (UE-A) and a UE 1010 (UE-B). UE-A uses a CS domain 1002 (CS domain-A) for a CS call and uses an IMS core network 1004 (IMS core network-A) for an IMS call. Similarly, UE-B uses a CS domain 1008 (CS domain-B) for a CS call and uses an IMS core network 1006 (IMS core network-B) for an IMS call.

Referring to FIG. 10, UE-A and UE-B are conducting a CS speech call in step 1012. As UE-A implements a handover by moving into a CSI area (e.g. a UTRAN area) in step 1014, UE-A updates UE-ASL-A so that it contains CSI available information in step 1016. UE-A compares UE-ASL-A with a stored UE-ASL-B in step 1018 and updates an ASL according to the comparison result in step 1020. If determining to send the ASL by IMS signaling, UE-A performs IMS registration to IMS core network-A when needed in step 1022. In step 1024, UE-A sends the updated ASL in an OPTIONS+ message to UE-B. The OPTIONS+ message has the configuration illustrated in FIG. 5A. If the ASL contains only the CSI available information, the ASL is identical to the CS available information in the exemplary embodiment of the present invention. Unless otherwise specified, the entire ASL or the CSI available information can be sent to UE-B.

In steps 1026 and 1028, the OPTIONS+ message is sent to UE-B via IMS core network-B. UE-B updates the ASL according to the OPTIONS+ message in step 1030 and sends a 200 OK message as an ACK indicating successful reception of the ASL in steps 1032, 1034 and 1036. In steps 1038 and 1040, UE-A and UE-B notify their users of the updated ASL.

Each UE can periodically send the OPTIONS or OPTIONS+ message to trace the state of the other party. In case of the CSI service, if the other UE moves from a UTRAN area to a plane GERAN area by handover, the user can find out that the CSI service is unavailable by sending the OPTIONS or OPTIONS+ message.

FIG. 11 is a diagram illustrating CS signaling using FAR and FAA according to the second exemplary embodiment of the present invention. A CSI service is available to a UE 1100 (UE-A) and a UE 1110 (UE-B). UE-A uses a CS domain 1102 (CS domain-A) for a CS call and uses an IMS core network 1104 (IMS core network-A) for an IMS call. Similarly, UE-B uses a CS domain 1108 (CS domain-B) for a CS call and uses an IMS core network 1106 (IMS core network-B) for an IMS call. A NOTIFY message uses FAR and FAA as an ISUP.

Referring to FIG. 11, UE-A and UE-B are conducting a CS speech call in step 1112. As UE-A implements a handover to a CSI area (e.g. a UTRAN area) in step 1114, UE-A updates UE-ASL-A so that it contains CSI available information in step 1116. UE-A compares UE-ASL-A with a stored UE-ASL-B in step 1118 and updates an ASL according to the comparison result in step 1120. When determining to send the ASL by CS signaling, UE-A sends the updated ASL in a NOTIFY message toward UE-B in step 1122. If the ASL contains only the CSI available information, the ASL is identical to the CSI available information in the exemplary embodiment of the present invention. The Notify message has the configuration illustrated in FIG. 6.

CS domain-A sends the CSI available information in the UUI field of a FAR message to CS domain-B in step 1124 and CS domain-B sends the CSI available information in a NOTIFY message to UE-B in step 1126. In step 1128, UE-B updates a stored ASL with the CSI available information extracted form the NOTIFY message. UE-B then sends a NOTIFY message including the CSI available information to CS domain-B in step 1130.

CS domain-B sends the CSI available information in the UUI field of an FAA message to CS domain-A in step 1132 and CS domain-A sends the CSI available information in a NOTIFY message to UE-A in step 1134. When needed, UE-A performs IMS registration to IMS core network-A in step 1136. In steps 1138 and 1140, UE-A and UE-B send the updated ASL to their users to notify that the CSI service is available.

FIG. 12 is a diagram illustrating CS signaling using User-to-User Information Message (USR) according to the second exemplary embodiment of the present invention. A CSI service is available to a UE 1200 (UE-A) and a UE 1210 (UE-B). UE-A uses a CS domain 1202 (CS domain-A) for a CS call and uses an IMS core network 1204 (IMS core network-A) for an IMS call. Similarly, UE-B uses a CS domain 1208 (CS domain-B) for a CS call and uses an IMS core network 1206 (IMS core network-B) for an IMS call. A NOTIFY message uses a USR message as an ISUP. Compared to the procedure illustrated in FIG. 11, an ISUP message delivering a NOTIFY message between CS domain-A and CS domain-B is a USR message.

To use an USR message in an ISUP, indications that the USR message will be used during a call are exchanged between UEs during a CS call setup. The call setup illustrated in FIG. 12 involves the USR indication exchange (steps 1212 to 1222).

Referring to FIG. 12, UE-A sets a USR indication indicating that a USR message will be used in a SETUP message for a CS call setup and sends the SETUP message to UE-B in step 1212. In step 1214, CS domain-A connected to UE-A sends an IAM message with the USR indication to CS domain-B connected to UE-B. CS domain-B sends a SETUP message with the USR indication to UE-B in step 1216. UE-B stores the USR indication with respect to UE-A and then sends a CONNECT message with a USR indication to UE-A in step 1218. CS domain-B sends the US indication in an Answer Message (ANM) message to CS domain-A in step 1220 and CS domain-A sends a CONNECT message with the USR indication to UE-A in step 1222.

After the call setup, UE-A and UE-B are conducting a CS speech call in step 1224. As UE-A implements a handover to a CSI area (e.g. a UTRAN area) in step 1226, UE-A updates UE-ASL-A so that it contains CSI available information in step 1228. UE-A compares UE-ASL-A with a stored UE-ASL-B in step 1230 and updates an ASL according to the comparison result in step 1232. When determining to send the ASL by CS signaling, UE-A sends the updated ASL in a NOTIFY message toward UE-B in step 1234. If the ASL contains only the CSI available information, the ASL is identical to the CSI available information in the exemplary embodiment of the present invention.

CS domain-A sends the CSI available information in the UUI field of a USR message to CS domain-B in step 1236 and CS domain-B sends the CSI available information in a NOTIFY message to UE-B in step 1238. In step 1240, UE-B updates a stored ASL with the CSI available information extracted form the NOTIFY message. UE-B then sends a NOTIFY message including the CSI available information to CS domain-B in step 1242.

CS domain-B sends the CSI available information in the UUI field of a USR message to CS domain-A in step 1244 and CS domain-A sends the CSI available information in a NOTIFY message to UE-A in step 1246. When needed, UE-A performs IMS registration to IMS core network-A in step 1248. In steps 1250 and 1252, UE-A and UE-B send the updated ASL to their users to notify that the CSI service is available.

EXEMPLARY APPARATUSES

Figure 13:
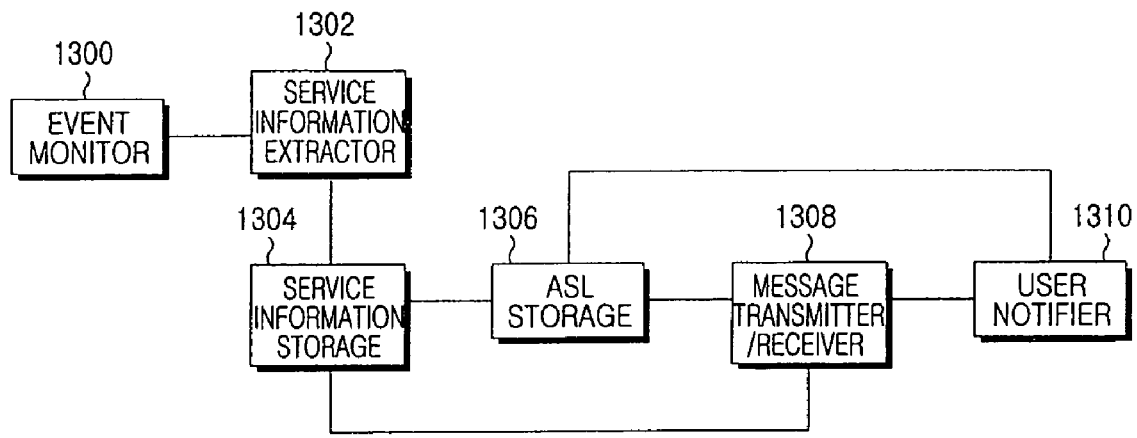
FIG. 13 is a block diagram of a UE apparatus according to an exemplary embodiment of the present invention.

FIG. 13 is a block diagram of a UE apparatus (i.e. for UE-A) according to an exemplary embodiment of the present invention Referring to FIG. 13, the UE includes an event monitor 1300, a service information extractor 1302, a service information storage 1304, an ASL decider 1306, a message transmitter/receiver 1308, and a user notifier 1310.

The event monitor 1300 monitors generation of an event triggering a change in the state of the UE. The service information extractor 1302 compares its UE-ASL (i.e. UE-ASL-A) with the UE-ASL of the other party (i.e. UE-ASL-B) and, when necessary, updates UE-ASL-A according to an event monitored by the event monitor 1300. The service information storage 1304 stores and manages service information such as ASL, UE-ASL, and UE-SSL. The ASL decider 1306 compares the UE-ASLs stored in the service information storage 1304 and determines whether an ASL change has occurred. In case of an ASL change, the ASL decider 1306 updates an ASL stored in the service information storage 1304.

The message transmitter/receiver 1308 exchanges service information with the other entity participating in a call connection. Specifically, the message transmitter/receiver 1308 determines a message exchange scheme and notifies the other entity of an updated UE-ASL or an updated ASL in the afore-described procedure. It also receives an updated UE-ASL or an updated ASL from the other entity. The user notifier 1310, when the ASL is updated, notifies the user of the updated ASL, that is, notifies the user that the CSI service is available, visually (e.g. text, image or icon), audibly (e.g. by voice), or by vibrations.

Figure 14:
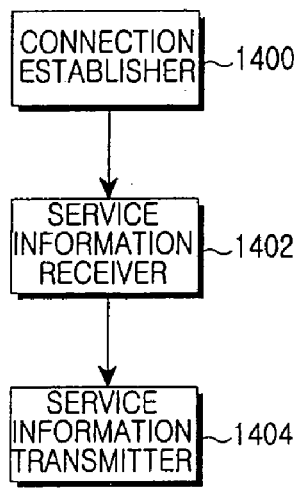
FIG. 14 is a block diagram of a network apparatus according to an exemplary embodiment of the present invention.

FIG. 14 is a block diagram of a network apparatus according to an exemplary embodiment of the present invention. The network apparatus is a network node through which a message sent from UE-A or UE-B passes within a network. For example, the network node can be a CS-domain Mobile Switching Center (MSC) or a Call Session Control Function (CSCF) in an IMS core network.

Referring to FIG. 14, the network apparatus includes a connection establisher 1400, a service information receiver 1402, and a service information transmitter 1404.

The connection establisher 1400 establishes a connection between a UE and the other UE. The service information receiver 1402 receives service information, that is, an updated UE-ASL or ASL that the user or the UE sends to the other UE. The service information transmitter 1404 sends the received service information to the other UE connected to the UE.

In accordance with exemplary embodiments of the present invention, upon generation an event triggering the state of one UE participating in a call, services available after the event occurrence are notified to each user. Therefore, various services can be used directly from a user's point of view and can be provided to users from a service provider's point of view.

While the invention has been shown and described with reference to certain exemplary embodiments thereof, it will be understood by those skilled in the art that various changes in form and details may be made therein without departing from the spirit and scope of the invention as defined by the appended claims and the full scope of equivalents thereof.

What is claimed is:

1. A method of notifying of service information changes according to the state of a first user equipment (UE: UE-A) in a wireless communication system, comprising the steps of:

establishing a connection with a second UE (UE-B) and receiving a service by the connection;

updating, upon generation of an event triggering a change in the state of UE-A during the service, an available service list for UE-A (UE-ASL-A) being supported in the UE-A after the state change;

sending service information indicating the updated UE-ASL-A to UE-B;

receiving an available service list for UE-B (UE-ASL-B) responding to the service information indicating the updated UE-ASL-A;

comparing the updated UE-ASL-A with UE-ASL-B and updating a list of common available services (ASL) according to the comparison; and notifying the UE-A of the updated ASL, while maintaining the connection.

2. The method of claim 1, wherein the service information sending step comprises the step of sending the service information by Internet Protocol Multimedia Subsystem (IMS) signaling using a Session Initiation Protocol (SIP) OPTIONS message.

3. The method of claim 1, wherein the service information sending step comprises the step of sending the service information by Circuit Switched (CS) signaling using an ISDN User Part (ISUP)-based NOTIFY message.

4. The method of claim 1, further comprising the step of sending service information indication the updated UE-ASL-A to UE-B, the service information including a combined Circuit Switched (CS) call and Internet Protocol Multimedia Subsystem (IMS) session (hereinafter CSI).

5. A method of receiving service information changes according to the state of a first user equipment (UE: UE-A) in a second UE (UE-B) in a wireless communication system, comprising the steps of:

establishing a connection with UE-A and receiving a service by the connection;

receiving, upon generation of an event triggering a change in the state of UE-A during the service, service information indicating an available service list for the UE (UE-ASL-A) being supported in UE-A after the state change from UE-A;

sending available services for UE-B (UE-ASL-B) to UE-A responding to receipt of the service information indicating the UE-ASL-A;

updating a list of common available services (ASL) by comparing the UE-ASL-A with the UE-ASL-B; and notifying the UE-B of the updated ASL, while maintaining the connection.

6. The method of claim 5, wherein the service information receiving step comprises the step of receiving the service information by Internet Protocol Multimedia Subsystem (IMS) signaling using a Session Initiation Protocol (SIP) OPTIONS message.

7. The method of claim 5, wherein the service information receiving step comprises the step of receiving the service information by Circuit Switched (CS) signaling using an ISDN User Part (ISUP)-based NOTIFY message.

8. The method of claim 5, further comprising the step of sending the UE-ASL-B to UE-A, the UE-ASL-B including a combined Circuit Switched (CS) call and Internet Protocol Multimedia Subsystem (IMS) session (hereinafter CSI).

9. An apparatus for notifying of service information changes according to the state of a first user equipment (UE: UE-A) in a wireless communication system, comprising:

an event monitor for establishing a connection with a second UE (UE-B) and monitoring generation of an event triggering a change in the state of UE-A during the service;

a service information storage for storing an available service list for UE-A (UE-ASL-A), an available service list for UE-B (UE-ASL-B), and a common available service list (ASL), the available service list being supported in UE-A or UE-B;

a service information extractor for, upon generation of an event, updating UE-ASL-A stored in the service information storage and controlling output of the updated UE-ASL-A and UE-ASL-B; an ASL comparator for updating the ASL by comparing the updated UE-ASL-A with UE-ASL-B;

a message transmitter and receiver for sending service information indicating the updated UE-ASL-A to UE-B; and a notifier for notifying the UE-A of the updated ASL, while maintaining the connection.

10. The apparatus of claim 9, wherein the service information storage receives UE-ASL-B from the message transmitter and receiver.

11. The apparatus of claim 9, wherein the message transmitter and receiver sends the service information by Internet Protocol Multimedia Subsystem (IMS) signaling using a Session Initiation Protocol (SIP) OPTIONS message.

12. The apparatus of claim 9, wherein the message transmitter and receiver sends the service information by Circuit Switched (CS) signaling using an ISDN User Part (ISUP)-based NOTIFY message.

13. An apparatus for receiving service information changes according to the state of a first user equipment (UE: UE-A) in a second UE (UE-B) in a wireless communication system, comprising:

a connection establisher for establishing a connection with UE-A and receiving a service by the connection;

a message transmitter and receiver for receiving, upon generation of an event triggering a change in the state of UE-A during the service, service information indicating an available service list for the UE (UE-ASL-A) according to the state change from UE-A and sending an available services for UE-B (UE-ASL-B) to the UE-A;

an ASL decider for updating a list of common available services (ASL) by comparing UE-ASL-A with the UE-ASL-B; and a notifier for notifying the UE-B of the updated ASL, while maintaining the connection.

14. The apparatus of claim 13, wherein the message transmitter and receiver sends UE-ASL-B to UE-A, after receiving the service information.

15. The apparatus of claim 13, wherein the message transmitter and receiver receives the service information by Internet Protocol Multimedia Subsystem (IMS) signaling using a Session Initiation Protocol (SIP) OPTIONS message.

16. The apparatus of claim 13, wherein the message transmitter and receiver receives the service information by Circuit Switched (CS) signaling using an ISDN User Part (ISUP)-based NOTIFY message.

17. A method of notifying of service information changes according to the state of a first user equipment (UE: UE-A) in a wireless communication system, comprising the steps of:

establishing a connection with a second UE (UE-B) and receiving a service by the connection;

updating, upon generation of an event triggering a change in the state of the UE during the service, an available service list for UE-A (UE-ASL-A) being supported in the UE-A after the state change;

comparing the updated UE-ASL-A with an available service list for UE-B (UE-ASL-B);

updating, if there is a change in a list of common available services (ASL) according to the comparison result, the ASL; and sending service information indicating the updated ASL to UE-B; and notifying the UE-A of the updated ASL, while maintaining the connection.

18. The method of claim 17, further comprising the step of receiving UE-ASL-B from UE-B.

19. The method of claim 18, wherein the service information sending step comprises the step of sending the service information by Internet Protocol Multimedia Subsystem (IMS) signaling using a Session Initiation Protocol (SIP) OPTIONS message.

20. The method of claim 18, wherein the service information sending step comprises the step of sending the service information by Circuit Switched (CS) signaling using an ISDN User Part (ISUP)-based NOTIFY message.

21. An apparatus for notifying of service information changes according to the state of a first user equipment (UE: UE-A) in UE-A in a wireless communication system, comprising:

an event monitor for establishing a connection with a second UE (UE-B) and monitoring generation of an event triggering a change in the state of UE-A during the service;

a service information storage for storing an available service list for UE-A (UE-ASL-A), an available service list for UE-B (UE-ASL-B), and a common available service list (ASL), the ASL being supported in the UE-A or UE-B;

a service information extractor for, upon generation of an event; updating UE-ASL-A stored in the service information storage and controlling output of the updated UE-ASL-A and UE-ASL-B; an ASL comparator for updating the ASL by comparing the updated UE-ASL-A with UE-ASL-B;

a message transmitter and receiver for sending service information indicating the updated ASL to UE-B; and a notifier for notifying the UE-A of the updated ASL, while maintaining the connection.

22. The apparatus of claim 21, wherein the service information storage receives UE-ASL-B from the message transmitter and receiver.

23. The apparatus of claim 21, wherein the message transmitter and receiver sends the service information by Internet Protocol Multimedia Subsystem (IMS) signaling using a Session Initiation Protocol (SIP) OPTIONS message.

24. The apparatus of claim 21, wherein the message transmitter and receiver sends the service information by Circuit Switched (CS) signaling using an ISDN User Part (ISUP)-based NOTIFY message.

* * * * *